Patented Sept. 8, 1953

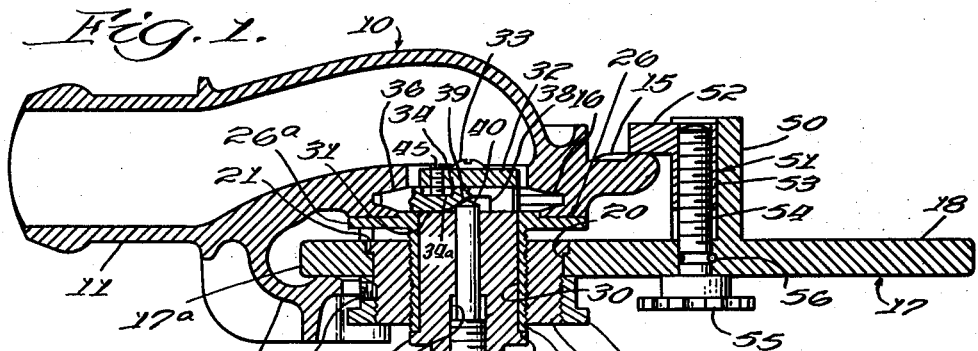
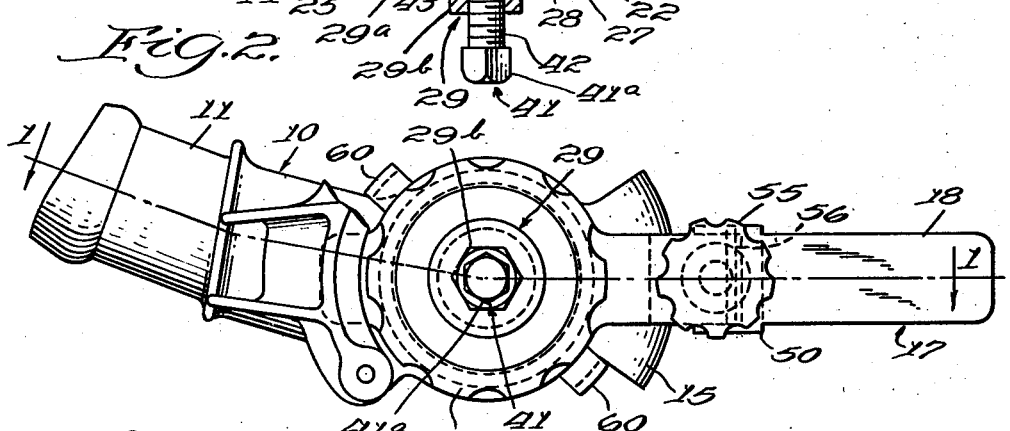
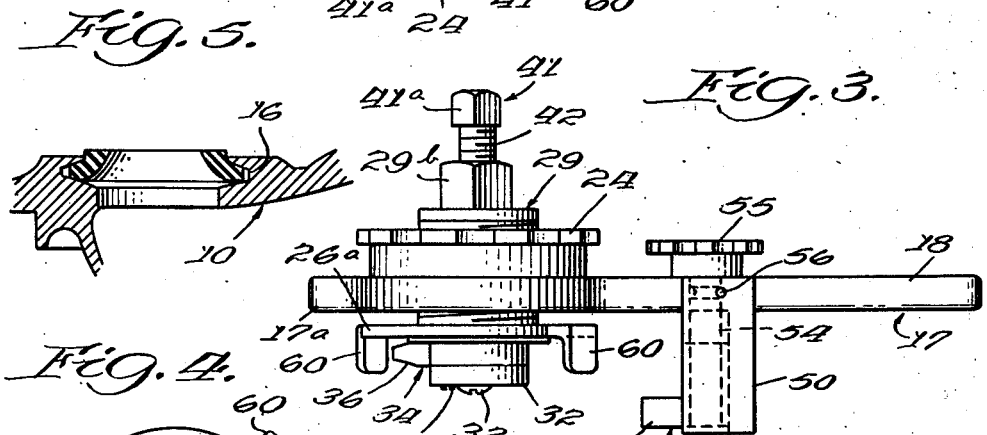
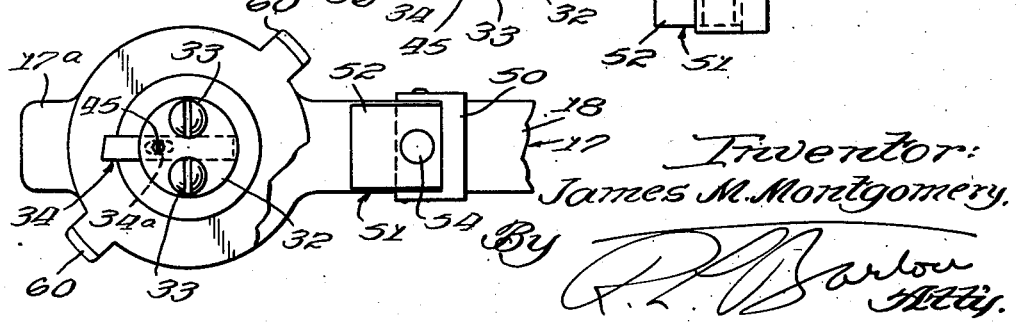

2,651,066

UNITED STATES PATENT OFFICE 2,651,066

BRAKE PIPE AND SIGNAL HOSE COUPLING GASKET GROOVE RECONDITIONING DEVICE

James M. Montgomery, Los Angeles, Calif.

Application August 24, 1951, Serial No. 243,552

5 Claims. (Cl. 15—104.02)

This invention relates to a portable device for train repairmen to use for reconditioning the gasket grooves of brake pipe and signal hose couplings.

Due to the imperfect seating of gaskets in the aforesaid type of grooves, as much as fifty pounds of air pressure may be lost in the rear cars of a train, thus greatly hampering braking operations.

The experience of trainmen has proved that the aforesaid leakage cannot be prevented by forcing new gaskets into obstructed grooves that have not been thoroughly cleaned, one reason for this being that gaskets applied under such conditions will be in a crimped, circumferentially distorted condition preventing efficient sealing. However, this misuse of new gaskets has been practiced for many years, owing to repairmen not having been provided with a proper tool usable to recondition the grooves with which said gaskets co-operate.

Furthermore, brake pipe leakage that is created by improperly fitting gaskets is made worse by the motion of the train, due to the flexibility of the brake pipe hose and its accessory equipment. Under present conditions, permissible leakage for each hose coupling is four pounds per minute with seventy pounds of air pressure.

Where there is excessive leakage, when a locomotive engineer applies the brakes it is impossible for him to determine what air pressure will be present in cars remote from the engine.

Accordingly, the present invention has been produced to meet the above indicated need of a tool usable by trainmen to recondition the gasket grooves of brake line hose couplings so that they will efficiently co-operate with contained gaskets to prevent leakage.

With this newly invented device a coupling gasket groove can be completely cleaned of all erosion and be brought to its normal contour in approximately three minutes.

By the use of this invention brake pipe leakage is virtually eliminated, enabling a uniform braking control of all the cars of a train, one of the beneficial results being less damage to shipments of a kind apt to be injured by excessive jarring. Tests by using the present device have shown that, when it is used to recondition a gasket groove, and a new gasket has been applied to the reconditioned groove in the proper manner, no leakage will result with one hundred ten pounds air pressure.

This newly invented pocket tool need weigh only two pounds, and, therefore, may be conveniently carried by a trainman and may always be at hand to be used for the intended purpose.

Other objects, advantages and features of invention will hereinafter appear.

Referring to the accompanying drawing, which illustrates a preferred, reduced to practice embodiment of the invention, Fig. 1 is a longitudinal midsection of the device showing the tool bit thereof applied to the gasket groove of a conventional brake pipe and signal hose coupling. The plane of section is indicated by obtusely angular line I—I on Fig. 2.

Fig. 2 is a bottom plan view of the structure shown in Fig. 1.

Fig. 3 is a side elevation of the device of Fig. 2, separately shown.

Fig. 4 is a fragmentary bottom plan view of the device shown in Fig. 3.

Fig. 5 is an enlarged fragmentary cross sectional view showing the conventional gasket seated in the groove therefor.

Referring in detail to the drawing, the hollow, somewhat elongated casting 10 of the hose coupling is provided at one end with a tubular extension 11 for having applied to it the brake line hose. This end portion of said casting has a laterally offset extension 14 which mates up with a similar connection carried by the other hose line to which this hose coupling is connected.

The opposite end of said casting 10 is provided with a segmental, outwardly directed lip or flange 15, the arcuate outer edge of which is concentric to the gasket groove 16.

To the aforesaid conventional structure is applicable the device which forms the subject matter of the present invention, the main parts of said device, shown per se in Figs. 3 and 4, being a flattened bar 17 one end portion 18 of which forms an operating handle, said bar, adjacent to its opposite end, being arcuately widened and provided, in the midwidth portion of its widened part with a circular aperture 20, one side portion of which is diametrically contracted, thus producing an annular shoulder 21. At the end opposite to its handle portion 18 said bar 17 is narrowed somewhat, as indicated at 17a. Said bar 17 serves as a mounting member which carries various other parts, mostly hereinafter described.

Said bar 17 is fulcrumed upon a swivel sleeve 22 which fits within said aperture 20 with a rotational working fit, this sleeve having a diametrically enlarged end portion which produces an annular shoulder 21 of the bar 17 when the parts are assembled.

A swivel nut 24 is employed to secure the swivel sleeve 22 in a working fit relation to the aforesaid bar 17, said nut being secured to said swivel sleeve by means of a set screw 25.

A tool bit holder guide 26 has an externally threaded tubular body portion 27 which is screwed into the internally threaded portion of the aforesaid sleeve 22, the outer end of said tool bit holder guide abutting against an annular shoulder 28 formed by the inner side of a peripheral flange 29a carried by the outer end portion of a generally cylindrical tool bit holder 29. Said tool bit holder 29 extends through the smooth tool bit holder 29 extends through the smooth bore 30 of the aforesaid tool bit holder guide 26.

The aforesaid tool bit holder 29 has a rectangular groove 31 cut across its inner end, the otherwise open side of said groove being closed by a circular cover plate 32 held in place by a pair of screws 33, one at each side of said groove. Within said groove is slidably mounted a tool bit 34 which is rectangular in cross section and which is provided with a transversely tapered cutting edge portion 36 contoured to fit the conventional aforesaid groove 16 to be cleaned out by the cutting portion of the tool bit.

Said tool bit 34 is provided with a cut-out 38 one side portion of which forms a cam face 39 adapted to be engaged by the conical, pointed end 40 of a tool bit adjuster 41. Said tool bit adjuster has a diametrically enlarged outer end portion 42 which screws into a threaded counterbore 43 tapped axially into the outer end portion of the tool bit holder 29. Said tool bit adjuster has a polygonal head 41a which is manually grippable to adjust the tool bit laterally to project it into the groove 16 to be cleaned out. Said tool bit holder 29 has a polygonal end extension 29b to which a ratchet wrench is applicable to operate the tool bit 34. Said tool bit carries a stop groove 34a in the face thereof which is shown opposite to the cam 39, and the circular plate 32 carries a set screw 45 the point of which occupies said groove and loosely locks said tool bit against becoming detached and lost, doing this without impairing its operation. Said groove is long enough to permit the tool bit adjuster to move the tool bit laterally to the required extent. Said tool bit is long enough to enter to the desired extent the groove to be cleaned thereby, but is not so long as to interfere with inserting it through the mouth of said groove 16, into its operative position; and the cam face 39 must be of such an extent as to be utilizable for adjusting the tool bit to the extent necessary to enable the latter properly to clean out the aforesaid conventional gasket containing groove 16.

The handle portion 18 of the tool has a channel shaped lateral extension 50 in which is mounted an L-shaped stop 51, which is adjustable lengthwise of said extension, said stop having its shorter arm 52 in a co-operative relation to the outer side of the aforesaid lateral lip 15 of the conventional casting. The longer arm 53 of said member 51 has a screwthreaded bore, and in a co-operative relation to said bore is a stop adjuster screw 54 having a fluted head 55 for its manual rotation. An unthreaded portion of said screw occupies a smooth bore in the handle 18 and is there rotatably held in place by a pin 56 which occupies half the width of said groove and half the width of a groove in said handle. Screwing down said stop adjuster 54 causes the arm 51 of the extension 50 forcibly to abut as a clamp jaw the outer side of the lip 15 of the main casting, which, in co-operation with the aforesaid flange 26 of the tool bit holder guide, is one step in securing the device in a properly mounted operative relation to said casting.

When the parts are assembled in the relative positions illustrated in Fig. 1, a slight lateral tolerance or axial play will be permitted between the tool holder and its appendages, that is to say between the flange 29a and the shoulder 22 as well as between the ends of the tool bit proper and the tool bit holder which it overlies. This tolerance allows the cutter bit 34 automatically to center itself in relation to the gasket groove 16 which it is cleaning out.

A pair of lugs 60 project radially and laterally from the peripheral portion of flange 26a of the aforesaid tool bit holder guide to assist in preventing relative rotation of the latter in relation to these types of couplings having parts with which said lugs cooperate.

It is obvious how the adjustable stop 51 is associated with the stop adjuster 54 as shown in the right hand portion of Fig. 1. With regard to the assembling of the remaining parts of the device, the swivel sleeve 22 and swivel sleeve nut 24 are joined together with the counterbore portion of the handle 17 held in place therebetween. Next the tool bit holder guide 26 is screwed into the swiveled sleeve 22, and then the cylindrical body portion of the tool bit holder 29 is projected through the tool bit holder guide 26. Then the tool bit 34 is laterally inserted into its groove and held adjustably in place by the set screw 45. Then the tool bit adjuster 41 is screwed into a position wherein its conical end comes into contact with the cam face 39 of the tool bit to cause the latter to be moved laterally so as to properly position the cutting end of the tool in relation to the gasket groove 16 it is to clean.

In assembling the device as a whole in relation to the conventional brake pipe and signal hose coupling, the tool bit 34 is projected through the mouth of the gasket groove until stopped by the flange 26a of the tool bit holder guide abutting the outer face of the gasket groove. Then the L-shaped adjustable stop 51 is brought into an overlying relation to the lateral lip 15, and by rotating its head 55 said stop adjuster is brought into clamping relation to said lip 15. Thereupon the swivel nut 24 is so adjusted as to bring the inner end portion of the handle bar 17 into a clamping relation to the offset portion 14 of the main casting. After the tool bit adjuster 41 has been rotated to laterally extend the working end of the tool bit into a cleaning relation to the gasket groove it is to clean, a ratchet wrench is applied to the polygonal portion 29b of the tool bit holder and given a complete rotation after which the device is removed and a new gasket is placed in the reconditioned groove.

It will be observed that the parts 14 and 15 of the coupling casting 10 are substantially diametrically opposite to each other, and that in applying the device to said casting it is abutted thereagainst in an overlying relation to the side portion of the casting between said two parts, and then after being given a semi-rotation, the device may be fully applied, in the manner which has been described.

In practice it has been found that, in the conventional castings to which this device is applicable, there is a variation in the extent to which the extension 14 (see left hand portion of Fig. 1) is offset from the body portion of the casting. In order to adapt the tool to this variation, the tool bit holder guide 26 and surrounding swivel sleeve 22 are made relatively rotatable, so that a preliminary adjustment can be made between these two parts, prior to the adjustment of the stop carrying part 51 to complete the operation of securing the device to the casting.

In order to prevent rotation of the tool bit holder guide 26 in relation to the swivel sleeve 22 and nut 24 secured to said sleeve, the aforesaid lugs 60 are provided on flange 26a of said part 26, and when the device is being secured to the casting said lugs prevent the rotation of the device in relation to said casting in an anti-clockwise direction beyond the position thereof shown in Fig. 2, so that when the workman turns the swivel nut 24 together with the swivel sleeve 22, he will not, with these two parts, turn the tool bit holder guide 26.

In case corrosion causes the tool bit holder guide 26 to resist being turned in relation to the swivel sleeve 22 and swivel nut 24 attached to said sleeve, said stop lugs 60 enable the workman to overcome such resistance and then adjust the parts as required.

The value of the tool which forms the subject matter of this invention will be realized when it is considered that a trainman furnished therewith and having a supply of gaskets in his pocket can quickly recondition a considerable number of defective hose couplings without much delaying the departure of a train.

I claim:

1. In a device for reconditioning the gasket groove of a conventional brake pipe and signal hose coupling, a mounting member, means carried by said mounting member to secure it to said coupling, an elongated tool bit having a cutting end portion contoured and dimensioned to clean out the aforesaid gasket groove, and adjustable means intermediate said mounting member and tool bit to position the latter with its cutting end portion in position to clean said gasket groove, said adjustable intermediate means including a rotatable member which is operable to impart to said tool bit a rotational movement causing it to clean said groove; said means for securing said mounting member to said coupling consisting of a plurality of parts carried by said mounting member one of which is located at one side of the part of the coupling which is furnished with the gasket groove and another co-operative part of said plurality of parts being located at the opposite side of the part of the coupling which is furnished with said gasket groove, said two co-operating parts having oppositely directed face portions abuttable against conventional parts of the coupling to clamp the coupling between them.

2. In a device for reconditioning the gasket groove of a conventional brake pipe and signal hose coupling, a bar having a handle portion at one end and having its opposite end positioned to overlie and interlock with the offset extension of the conventional coupling casting, said bar having through it intermediate its ends a circular aperture which is counterbored thus providing it with an annular shoulder, a swivel sleeve fitted within said aperture, said sleeve having around it an external annular shoulder which co-operates with the annular shoulder of said aperture to lock said sleeve against being withdrawn from said aperture in one direction, said sleeve when in its mounted position having an externally screwthreaded portion which projects in the aforesaid direction from the exposed side of said bar, a swivel nut screwing onto said projecting portion of said swivel sleeve to lock said sleeve in its mounted position on said bar, a tool bit holder guide having an externally screwthreaded tubular portion screwed into said swivel sleeve, said tubular portion carrying a circumferential flange abuttable against the mouth portion of the gasket carrying grooved part of the coupling, a generally cylindrical tool bit holder fitted within said tool bit holder guide and projecting from both ends thereof, one end portion of said tool bit holder projecting beyond said circumferencial flange of said tool bit holder guide and being contoured to form a transverse guide for a tool bit, a tool bit slidably fitted within said guide for longitudinal adjustment therein, manually adjustable means carried by said tool bit holder and operatively connected to said tool bit to adjust the latter into an operative relation to the groove to be cleaned, and a clamp member carried by said bar and abuttable against the back side of the conventional segmental flange of the coupling.

3. The structure set forth in claim 2 and said bar having adjacent to its said handle portion a lateral extension forming a guide, and an adjustable stop operating in said guide and securable at different points therealong, said stop having a laterally offset portion constituting a clamp member abuttable against the back side of the conventional segmental flange of the coupling.

4. In a device for reconditioning the gasket groove of a conventional brake pipe and signal hose coupling, a bar having a handle portion at one end and having its opposite end positioned to overlie and interlock with the offset extension of the conventional coupling casting, said bar having through it intermediate its ends a circular aperture, a swivel sleeve fitted within said aperture, means to lock said sleeve against being withdrawn from said aperture in one axial direction. said sleeve when in its mounted position having an externally screwthreaded portion which projects in the aforesaid direction from the exposed side of said bar, a swivel nut screwing onto said projecting portion of said swivel sleeve to lock said sleeve in its mounted position on said bar, a tool bit holder guide having an externally screwthreaded tubular portion screwed into said swivel sleeve, said tubular portion carrying a circumferential flange abuttable against the mouth portion of the grooved part of the coupling, means carried by said tool bit holder guide to interlock with said coupling to maintain said tool bit holder guide against rotation in relation to said sleeve when said tool bit holder guide is rotationally adjusted in relation to said sleeve, a generally cylindrical tool bit holder fitted within said tool bit holder guide and projecting from both ends thereof, the inserted end portion of said tool bit holder being contoured to form a transverse guide for a tool bit, a tool bit slidably fitted within said guide for longitudinal adjustment therein, and manually adjustable means carried by said tool bit holder and operatively connected to said tool bit to adjust the latter into an operative relation to the groove to be cleaned, and a clamp member carried by said bar adjacent to its handle portion, said clamp member being abuttable against the back of the coupling in opposition to the aforesaid circumferential flange of the tubular portion of the aforesaid tool bit holder guide.

5. In a device for reconditioning the gasket groove of a conventional brake pipe and signal hose coupling, a mounting member, means carried by said mounting member to secure it to said coupling, an elongated tool bit having a cutting end portion contoured and dimensioned to clean out the aforesaid gasket groove, and adjustable means intermediate said mounting member and tool bit to position the latter with its cutting end portion in position to clean said gasket groove, said adjustable intermediate means including a rotatable member which is operable to impart to said tool bit a rotational movement causing it to clean said groove, said means for securing said mounting member to said coupling consisting of a plurality of parts carried by said mounting member one of which is located at one side of the part of the coupling which is furnished with the gasket groove and another co-operative part of said plurality of parts being located at the opposite side of the part of the coupling which is furnished with said gasket groove, said two co-operating parts having oppositely directed face portions abuttable against conventional parts of the coupling to clamp the coupling between them.

JAMES M. MONTGOMERY.

References Cited in the file of this patent

UNITED STATES PATENTS

| Number | Name | Date |
| --- | --- | --- |
| 497,015 | Conde | May 9, 1893 |
| 1,974,097 | Beard | Sept. 18, 1934 |
| 2,480,058 | Stetzel | Aug. 23, 1949 |
| 2,505,840 | Shonnard | May 2, 1950 |
| 2,568,683 | Mayher | Sept. 18, 1951 |